(12) United States Patent
Asaoka et al.

(10) Patent No.: US 8,558,972 B2
(45) Date of Patent: Oct. 15, 2013

(54) LIQUID CRYSTAL DISPLAY DEVICE AND METHOD FOR FABRICATING THE SAME

(75) Inventors: Yasushi Asaoka, Osaka (JP); Eiji Satoh, Osaka (JP); Kazuhiro Deguchi, Osaka (JP); Sayuri Fujiwara, Osaka (JP); Takafumi Matsuda, Osaka (JP); Katsuhiro Mikumo, Osaka (JP); Kazunori Tanimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 120 days.

(21) Appl. No.: 13/255,165

(22) PCT Filed: Oct. 30, 2009

(86) PCT No.: PCT/JP2009/005793
§ 371 (c)(1),
(2), (4) Date: Sep. 7, 2011

(87) PCT Pub. No.: WO2010/103589
PCT Pub. Date: Sep. 16, 2010

(65) Prior Publication Data
US 2012/0002142 A1    Jan. 5, 2012

(30) Foreign Application Priority Data
Mar. 13, 2009  (JP) .................................. 2009-061617

(51) Int. Cl.
*G02F 1/1333*        (2006.01)

(52) U.S. Cl.
USPC ............... 349/86; 349/93; 349/104; 349/110; 349/187; 349/189

(58) Field of Classification Search
USPC ......... 349/56, 58, 86, 93, 104, 110, 187, 189, 349/190, 84; 438/30; 445/24
See application file for complete search history.

(56) References Cited

U.S. PATENT DOCUMENTS

| | | | |
|---|---|---|---|
| 7,505,091 B2 * | 3/2009 | Hirakata et al. | 349/38 |
| 7,859,615 B2 * | 12/2010 | Hoshino et al. | 349/93 |
| 2007/0216830 A1 * | 9/2007 | Hoshino et al. | 349/86 |
| 2008/0102548 A1 * | 5/2008 | Hirakata et al. | 438/30 |
| 2009/0303427 A1 | 12/2009 | Kondo et al. | |
| 2012/0002142 A1 * | 1/2012 | Asaoka et al. | 349/86 |

FOREIGN PATENT DOCUMENTS

| | | |
|---|---|---|
| EP | 1 306 716 A2 | 5/2003 |
| JP | 8-101405 | 4/1996 |
| JP | 9-90383 | 4/1997 |
| JP | 2007-248685 | 9/2007 |
| JP | 2008-3382 | 1/2008 |
| WO | WO 2006/098475 A | 9/2006 |

OTHER PUBLICATIONS

International Search Report for PCT/JP2009/005793, mailed Feb. 9, 2010.

* cited by examiner

*Primary Examiner* — Jennifer Doan
(74) *Attorney, Agent, or Firm* — Nixon & Vanderhye P.C.

(57) ABSTRACT

A liquid crystal display device includes a first substrate and a second substrate disposed to face each other, a polymer-dispersed liquid crystal layer provided between the first substrate and the second substrate, and a black matrix provided on the first substrate, where a display region for displaying an image and a frame region around the display region are defined, and in the frame region, the black matrix includes a plurality of light-blocking regions spaced apart from one another.

6 Claims, 11 Drawing Sheets

LIQUID CRYSTAL DISPLAY DEVICE AND METHOD FOR FABRICATING THE SAME

This application is the U.S. national phase of International Application No. PCT/JP2009/005793 filed Oct. 30 2009 which designated the U.S. and claims priority to JP Patent Application No. 2009-061617 filed Mar. 13 2009, the entire contents of each of which are hereby incorporated by reference.

TECHNICAL FIELD

The present invention relates to liquid crystal display devices and a method for fabricating the same, and more particularly to liquid crystal display devices using polymer-dispersed liquid crystal and a method for fabricating the same.

BACKGROUND ART

A liquid crystal display (hereinafter referred to as "LCD") device having an LCD panel using polymer-dispersed liquid crystal (hereinafter referred to as "PDLC") includes a polymer-dispersed liquid crystal layer, in which nematic liquid crystal is dispersed in a polymer matrix. For example, polymer network liquid crystal (PNLC) is one of such liquid crystal. An LCD device using PDLC is configured so that a difference between the refractive indices of the polymer region and of the liquid crystal region causes incident light incident upon the LCD panel to be scattered when a voltage is not applied to the liquid crystal layer, while a match between the refractive indices of the polymer region and of the liquid crystal region causes incident light incident upon the LCD panel to be transmitted through the liquid crystal layer when a voltage is applied to the liquid crystal layer. In addition, an LCD device using PDLC is capable of controlling transmission and scattering of incident light within the LCD panel, and thus is advantageous in that polarizing plates are not required, and therefore a bright display can be achieved.

An LCD device using PDLC having a configuration described above can be fabricated, for example, by filling the liquid crystal cells with a mixed material of a liquid crystal material and a monomer having photopolymerizability, irradiating the mixed material with light to polymerize the monomer, and dispersing the liquid crystal material in the polymer matrix in the form of small particles by phase separation due to the polymerization.

For example, Patent Document 1 describes that, in an LCD device having a light-scattering liquid crystal layer, a light-blocking layer of a counter substrate is formed so as to block light from gaps between pixel electrodes and signal lines along the signal lines in order to prevent the unpolymerized remaining portion of light curable resin from remaining.

CITATION LIST

Patent Document

PATENT DOCUMENT 1: Japanese Patent Publication No. H08-101405

SUMMARY OF THE INVENTION

Technical Problem

A light-blocking layer called black matrix is provided on one of a pair of substrates foaming an LCD panel in order to reduce light leakage in the vicinity of display lines and the occurrence of leakage currents due to light irradiation to thin film transistors (hereinafter referred to as "TFTs"). The black matrix is provided in the form of a lattice in a display region where images are displayed, and in the form of a frame in a frame region outside the display region.

Figure 13:
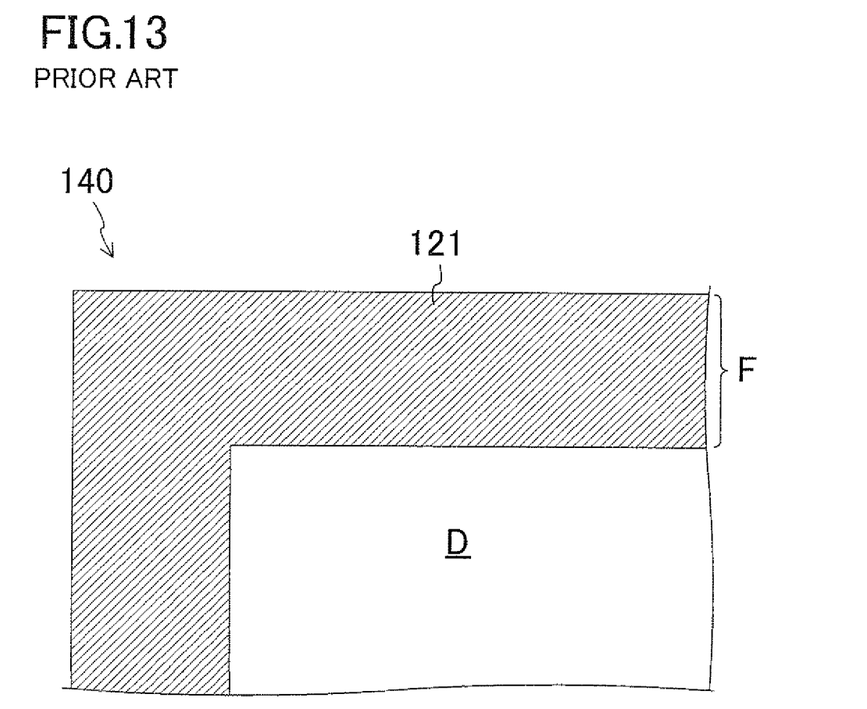
FIG. 13 is a top view of a conventional LCD panel 140 using PDLC.
Figure 14:
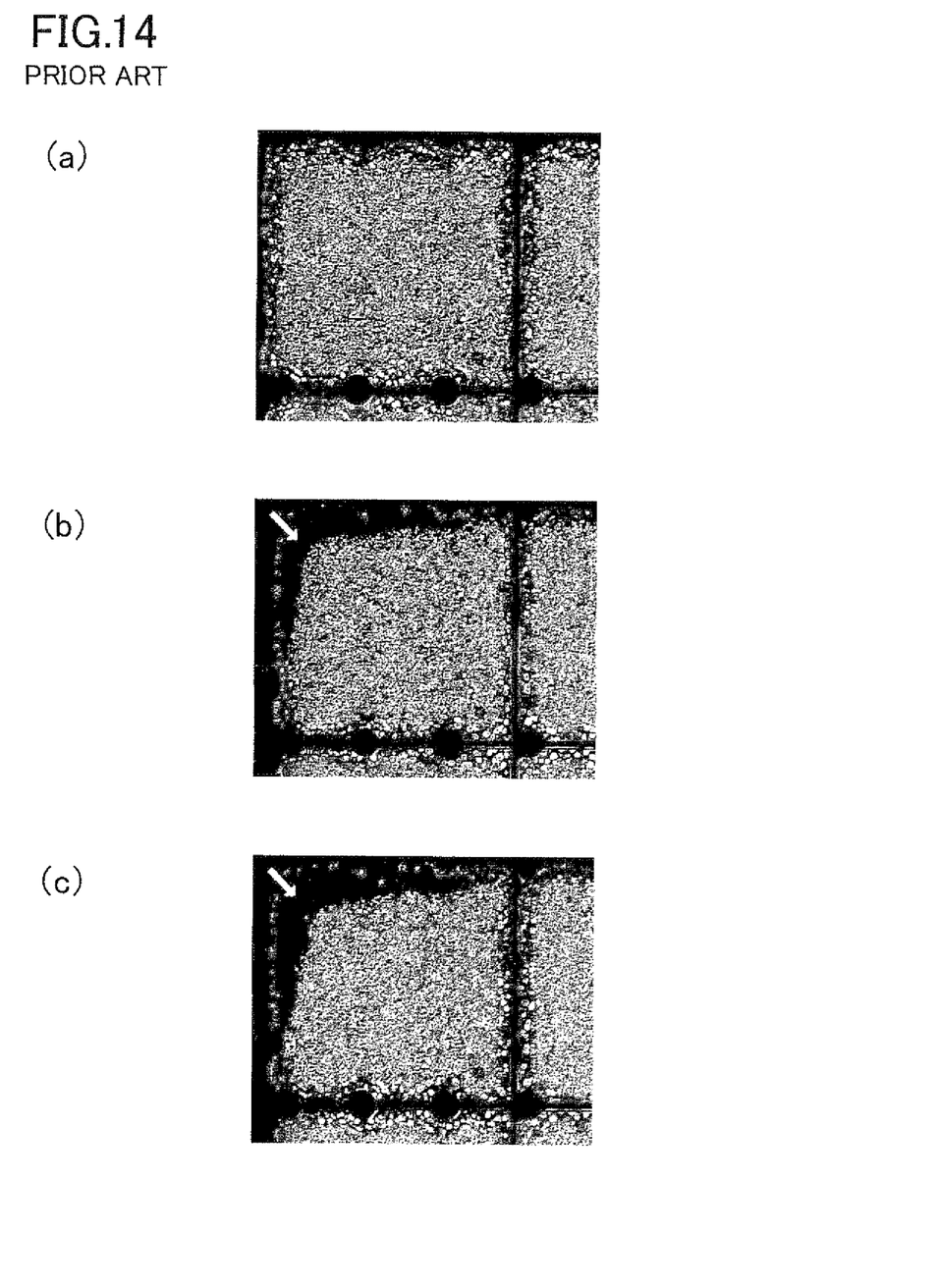
FIG. 14 is a set of micrographs showing a temporal change in an inner peripheral edge of a black matrix 121 of a frame region F in the LCD panel 140.

FIG. 13 is a top view of a corner of a conventional LCD panel 140 using PDLC, and FIG. 14 is a set of micrographs showing a temporal change in an inner peripheral edge of a black matrix 121 of a frame region F in the LCD panel 140. Specifically, FIG. 14(a) is a micrograph on the day when the LCD panel 140 is fabricated; FIG. 14(b) is a micrograph on a day after the fabrication of the LCD panel 140; and FIG. 14(c) is a micrograph on four days after the fabrication of the LCD panel 140.

In the conventional LCD panel using PDLC, as shown in FIG. 14, a dark color region (region indicated by the arrow in the figure) spreads over time in the peripheral edge of a display region D (see FIG. 13), and thus it is inferred that an isotropic phase of unreacted monomer penetrates from the frame region F (see FIG. 13) into the display region D over time. Thus, display non-uniformity due to the penetration occurs in the peripheral edge of the display region D, thereby reducing the display quality. In this regard, since the black matrix 121 in the frame region F is usually formed to have a width of about several millimeters, blocking of light for polymerizing the monomer may cause more unreacted monomer to remain in the frame region F than in the display region D.

The present invention has been made in view of the foregoing, and it is an object of the present invention to reduce the display non-uniformity due to penetration in the peripheral edge of the display region.

Solution to the Problem

In order to achieve the above object, the present invention provides a black matrix including a plurality of light-blocking regions spaced apart from one another in the frame region.

More specifically, a liquid crystal display device according to the present invention includes a first and a second substrates disposed to face each other, a polymer-dispersed liquid crystal layer provided between the first and the second substrates, and a black matrix provided on the first substrate, where a display region for displaying an image and a frame region around the display region are defined, and in the frame region, the black matrix includes a plurality of light-blocking regions spaced apart from one another.

With such a configuration, the black matrix provided on the first substrate includes a plurality of light-blocking regions spaced apart from one another in the frame region, and thus the frame region has no light-blocking properties such as those found in conventional ones, but has optical transparency between the plurality of light-blocking regions. Accordingly, the monomer having photopolymerizability contained in the polymer-dispersed liquid crystal layer is irradiated with light, thereby causing the remaining of unreacted monomer in the liquid crystal layer to be reduced. Thus, the penetration of unreacted monomer in the frame region into the display region is reduced, thereby causing the display non-uniformity due to penetration in the peripheral edge of the display region to be reduced.

Each of the light-blocking regions may be provided so as to overlap a semiconductor device disposed in the frame region.

With such a configuration, each of the light-blocking regions is provided so as to overlap a semiconductor device disposed in the frame region, and thus light incidence from the front to the semiconductor devices is reduced.

Each of the light-blocking regions may be provided with a shift toward the display region with respect to a semiconductor device disposed in the frame region.

With such a configuration, each of the light-blocking regions is provided with a shift toward the display region with respect to a semiconductor device disposed in the frame region, and thus incidence to the semiconductor devices of oblique light, such as, for example, diffracted light from an edge of the light-blocking member covering the frame region, and multiple-reflected light within the first substrate, is reduced.

The semiconductor devices may be thin film transistors.

With such a configuration, the semiconductor devices are thin film transistors, and thus the occurrence of leakage current due to light irradiation to the thin film transistors is reduced.

In the frame region, a light-blocking member having light-blocking properties may be provided in a frame shape.

With such a configuration, a light-blocking member having light-blocking properties is provided in a frame shape in the frame region, and thus peripheral circuits etc. disposed in the frame region are shielded, thereby allowing the appearance of the LCD device to be improved.

The plurality of light-blocking regions may be disposed such that more light-blocking regions are provided in the inner peripheral side of the frame region than in the outer peripheral side of the frame region.

With such a configuration, a light-blocking member having light-blocking properties is provided in a frame shape in the frame region, and the plurality of light-blocking regions are disposed such that more light-blocking regions are provided in the inner peripheral side of the frame region than in the outer peripheral side of the frame region, and thus incidence to the semiconductor devices of oblique light, such as diffracted light from an edge of the light-blocking member, and multiple-reflected light within the first substrate, is effectively reduced.

In the display region, a plurality of pixels each having a thin film transistor may be provided in a matrix, and the black matrix may include a plurality of light-blocking regions spaced apart from one another and overlapping the respective thin film transistors.

With such a configuration, the respective light-blocking regions included in the black matrix overlap the thin film transistors provided in the respective pixels in the display region, and thus the occurrence of leakage current due to light irradiation is specifically reduced in the thin film transistors of the respective pixels.

The black matrix may be made of resin.

With such a configuration, the black matrix is made of resin, and thus the black matrix is formed to a relatively large thickness, thereby causing the occurrence of diffracted light to be reduced on the backside of the black matrix.

In addition, a method for fabricating a liquid crystal display device according to the present invention includes a substrate manufacturing step of manufacturing a first substrate upon which a black matrix is formed, and a second substrate disposed to face the first substrate, a liquid crystal filling step of filling a gap between the first and the second substrates with a mixed material containing a liquid crystal material and a monomer which has photopolymerizability, and a light irradiation step of irradiating the mixed material with light to form a polymer-dispersed liquid crystal layer, where a display region for displaying an image and a frame region around the display region are defined, and, in the substrate manufacturing step, the black matrix includes a plurality of light-blocking regions spaced apart from one another in the frame region.

With such a method, the black matrix in the frame region of the first substrate includes a plurality of light-blocking regions spaced apart from one another in the substrate manufacturing step, and thus the frame region has no light-blocking properties such as those found in conventional ones, but has optical transparency between the plurality of light-blocking regions. Accordingly, in the light irradiation step, the monomer having photopolymerizability contained in the polymer-dispersed liquid crystal layer is irradiated with light, thereby causing the remaining of unreacted monomer in the liquid crystal layer to be reduced. Thus, the penetration of unreacted monomer in the frame region into the display region is reduced, thereby causing the display non-uniformity due to penetration in the peripheral edge of the display region to be reduced.

In the liquid crystal filling step, the mixed material may fill a bonded structure in which the first and the second substrates are bonded together.

With such a method, in the liquid crystal filling step, the mixed material containing the liquid crystal material and the monomer which has photopolymerizability fills a bonded structure in which the first and the second substrates are bonded together, and thus the liquid crystal display device is specifically fabricated using a vacuum filling technique.

Advantages of the Invention

According to the present invention, since the black matrix includes a plurality of light-blocking regions spaced apart from one another in the frame region, the display non-uniformity due to penetration in the peripheral edge of the display region can be reduced.

BRIEF DESCRIPTION OF THE DRAWINGS

FIG. 2 is a top view of a TFT substrate 20 included in the LCD device 50a.

FIG. 5 is a top view of the protection circuit 4a.

FIG. 8 is a top view of a corner of an LCD panel 40a included in the LCD device 50a.

DESCRIPTION OF EMBODIMENTS

Example embodiments of the present invention will be described below in detail based on the drawings. It is understood that the present invention is not limited to the particular embodiments described below.

<<First Embodiment of Invention>>

Figure 1:
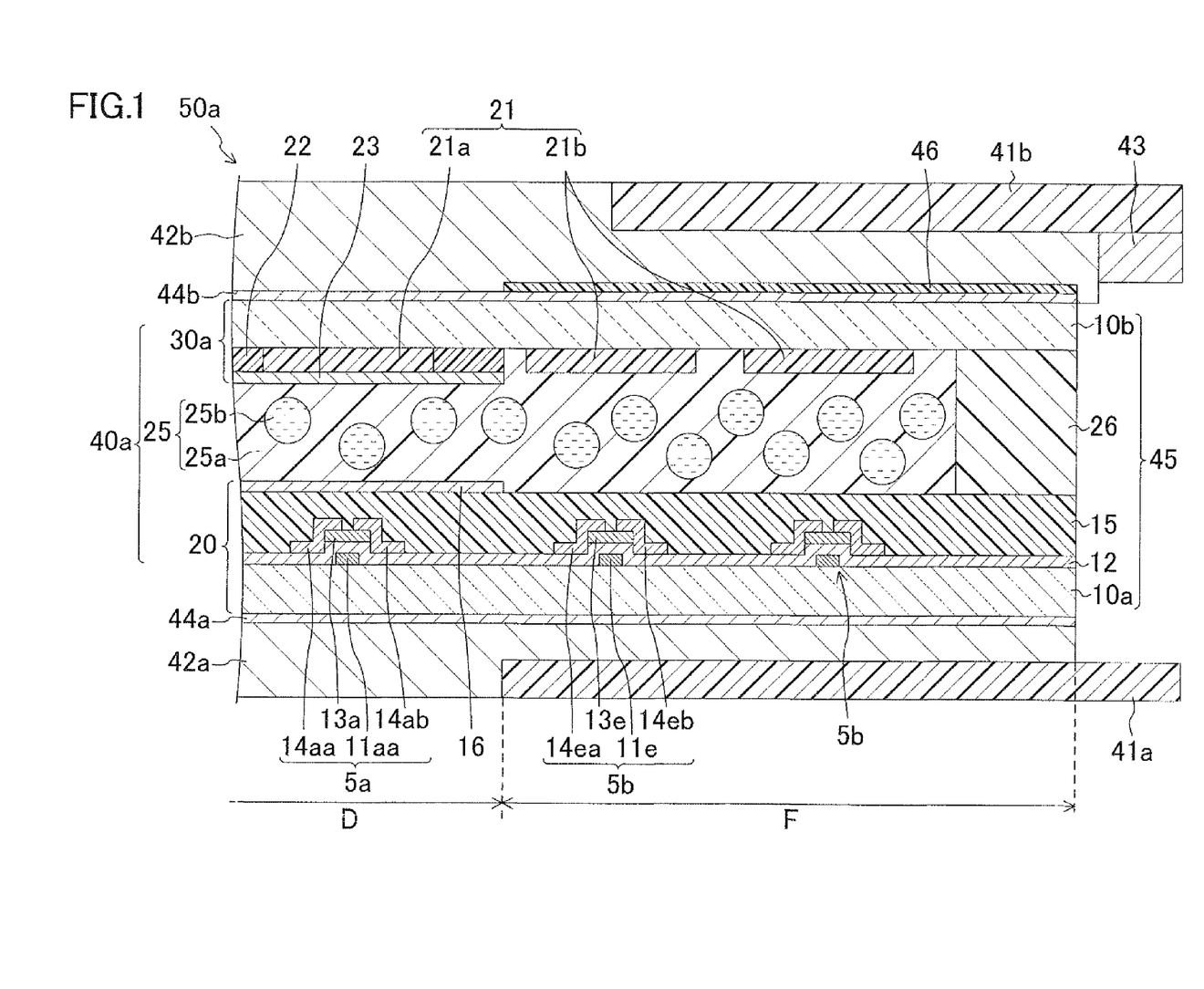
FIG. 1 is a cross-sectional view of an LCD device 50a according to the first embodiment.
Figure 2:
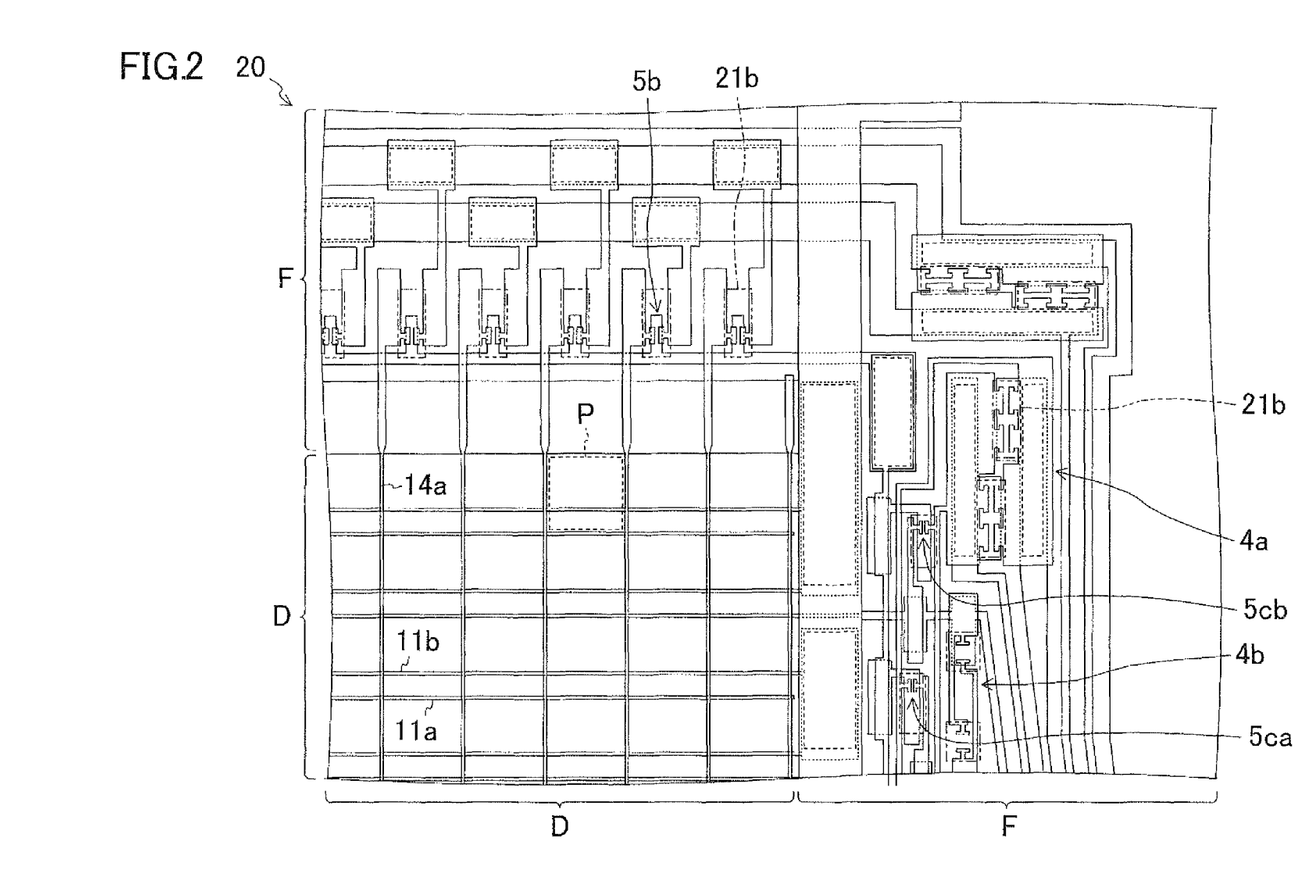
Figure 3:
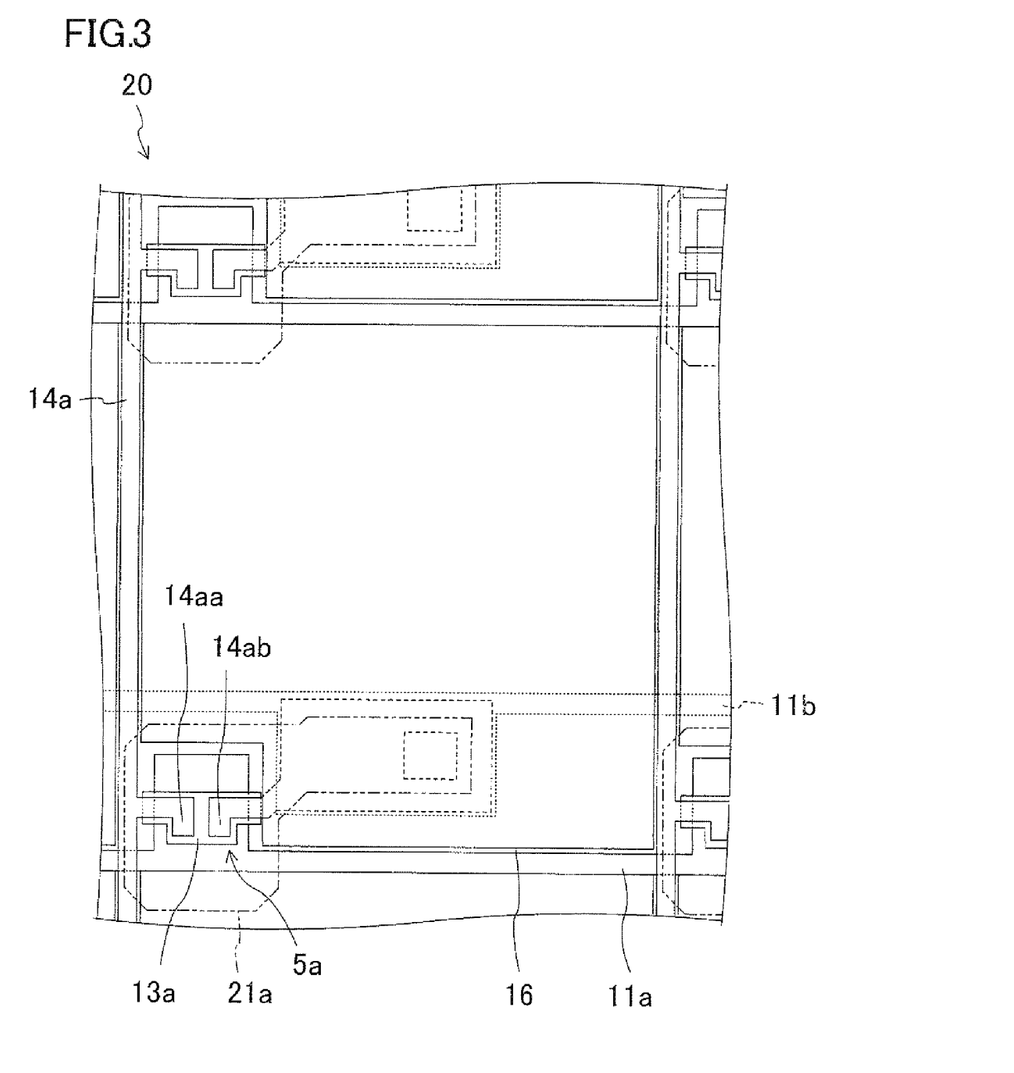
FIG. 3 is a top view illustrating each pixel P of the TFT substrate 20.
Figure 4:
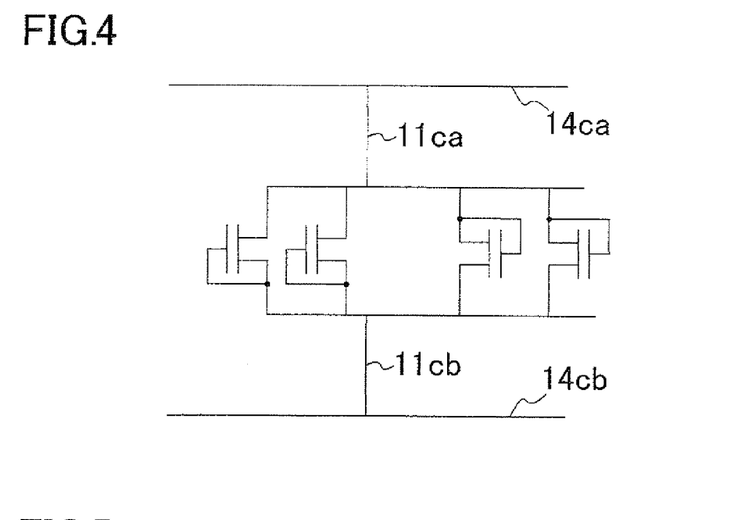
FIG. 4 is an equivalent circuit diagram of a protection circuit 4a included in the TFT substrate 20.
Figure 5:
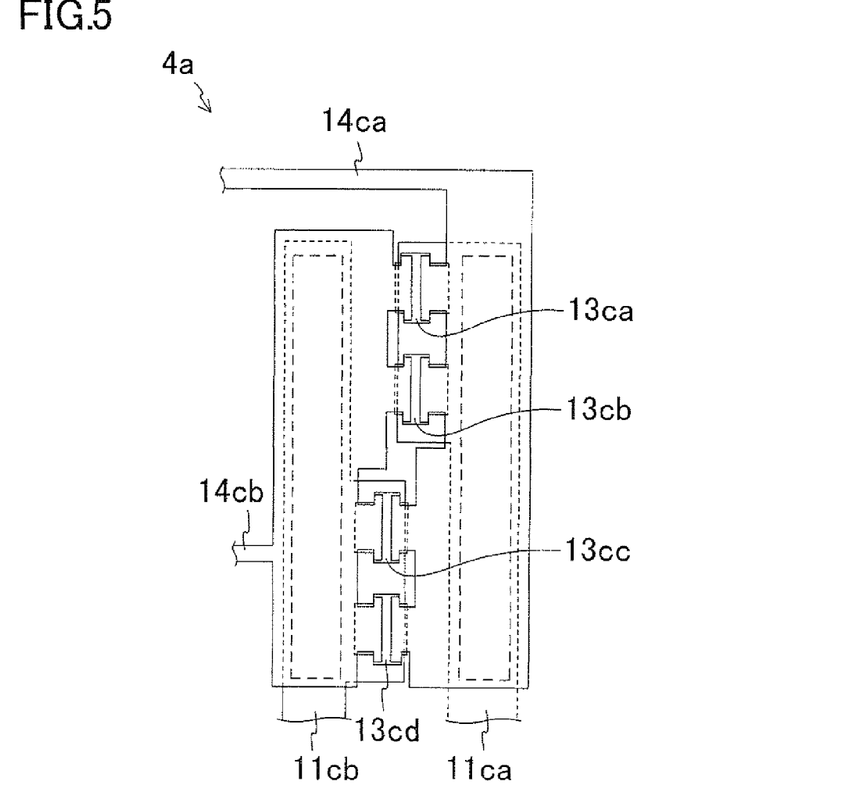
Figure 6:
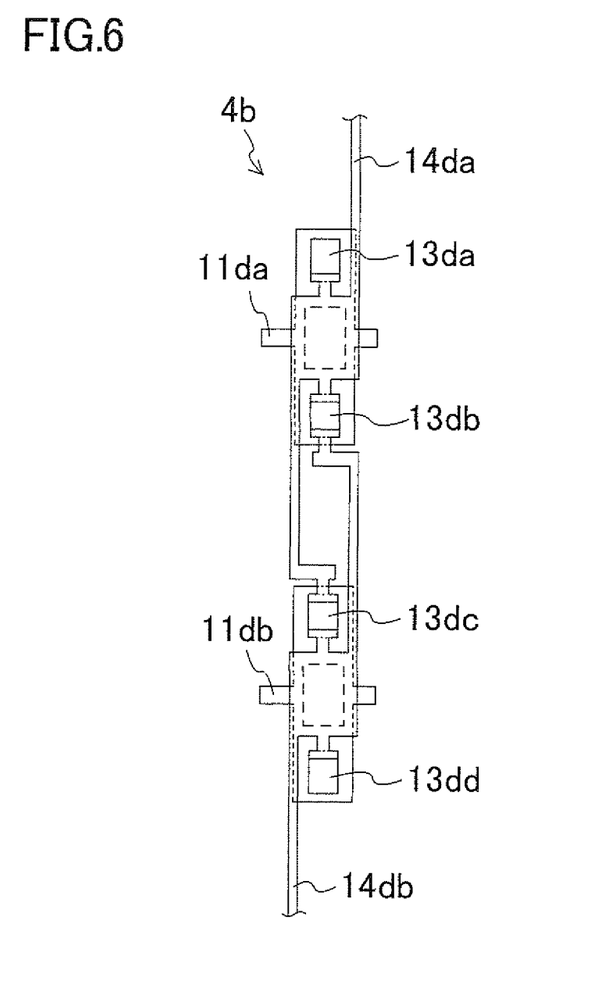
FIG. 6 is a top view of a protection circuit 4b included in the TFT substrate 20.
Figure 7:
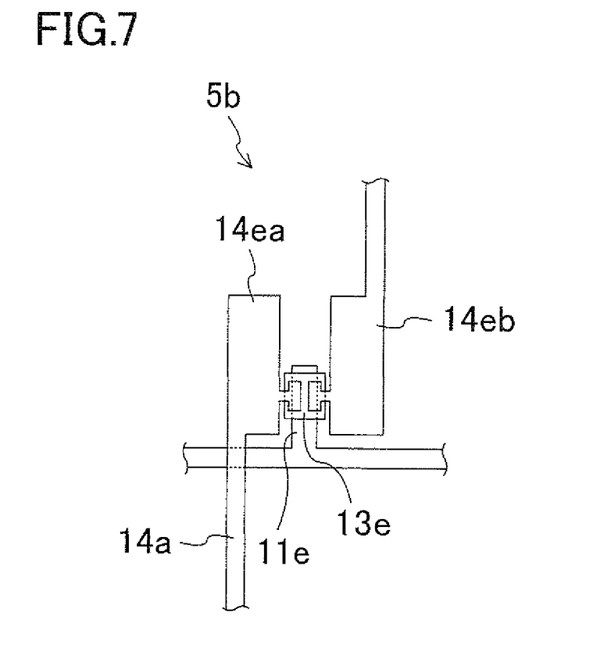
FIG. 7 is a top view of a TFT for inspection 5b included in the TFT substrate 20.

FIGS. 1-10 illustrate the first embodiment of the LCD device and the fabrication method thereof according to the present invention. Specifically, FIG. 1 is a cross-sectional view of an LCD device 50a of this embodiment, and FIG. 2 is a top view of a TFT substrate 20 included in the LCD device 50a. FIG. 3 is a top view illustrating each pixel P of the TFT substrate 20. FIG. 4 is an equivalent circuit diagram of a protection circuit 4a included in the TFT substrate 20, and FIG. 5 is a top view of the protection circuit 4a. FIG. 6 is a top view of a protection circuit 4b included in the TFT substrate 20, and FIG. 7 is a top view of a TFT for inspection 5b included in the TFT substrate 20.

As shown in FIG. 1, the LCD device 50a includes an LCD panel 40a, in which a display region D for displaying an image and a frame-shaped frame region F around the display region D are defined; a protection plate 42a made of acrylic resin provided under the LCD panel 40a with a transparent adhesion layer 44a interposed therebetween; a lower frame 41a, having light-blocking properties, provided under the protection plate 42a in the form of a frame so that the display region D of the LCD panel 40a is exposed; a light guide plate 42b made of acrylic resin provided over the LCD panel 40a with a transparent adhesion layer 44b interposed therebetween; a light-blocking film 46 provided under the light guide plate 42b in the form of a frame so that the display region D of the LCD panel 40a is exposed; an upper frame 41b provided over the light guide plate 42b in the form of a frame so as to be disposed more peripherally with respect to the light-blocking film 46; and a light emitting diode (LED) 43 provided along one side of the light guide plate 42b as a light source.

As shown in FIG. 1, the LCD panel 40a includes a color filter (CF) substrate 30a provided as a first substrate, thin film transistor (TFT) substrate 20 disposed to face the CF substrate 30a and provided as a second substrate, a polymer-dispersed liquid crystal layer 25 provided between the CF substrate 30a and the TFT substrate 20, and a sealing material 26 for bonding the CF substrate 30a and the TFT substrate 20 together and for sealing the liquid crystal layer 25 between the CF substrate 30a and the TFT substrate 20.

As shown in FIGS. 1-3, the TFT substrate 20 includes, in the display region D, a plurality of gate lines 11a provided so as to extend in parallel to one another over an insulating substrate 10a, a plurality of capacitor lines 11b provided so as to extend in parallel to one another between the respective gate lines 11a, a plurality of source lines 14a provided so as to extend in parallel to one another and perpendicular to the gate lines 11a and the capacitor lines 11b, a plurality of TFTs 5a respectively provided in intersection regions of the respective gate lines 11a and the respective source lines 14a, an interlayer insulation film 15 provided so as to cover the TFTs 5a, and a plurality of pixel electrodes 16 provided in a matrix over the interlayer insulation film 15.

In addition, as shown in FIGS. 1 and 2, the TFT substrate 20 includes, in the frame region F, protection circuits 4a and 4b for the gate lines 11a and a protection circuit (not shown) for source lines 14a for protecting the substrate against electrostatic discharge, TFTs for inspection 5ca and 5cb respectively provided at the ends of the gate lines 11a, and TFTs for inspection 5b respectively provided at the upper ends of the source lines 14a.

As shown in FIGS. 1 and 3, each of the TFTs 5a includes a gate electrode 11aa, which is a lateral protrusion of each of the gate lines 11a, a gate insulation film 12 provided so as to cover the gate electrode 11aa, a semiconductor layer 13a provided in the form of an island at a location corresponding to the gate electrode 11aa over the gate insulation film 12, and a source and a drain electrodes 14aa and 14ab provided so as to face each other over the semiconductor layer 13a. Here, the semiconductor layer 13a includes a lower layer, which is an intrinsic amorphous silicon layer (not shown) having a channel region (not shown) defined in the upper surface, and an n+ amorphous silicon layer (not shown) provided thereover. The source electrode 14aa is a lateral protrusion of each of the source lines 14a. The drain electrode 14ab is coupled to the corresponding pixel electrode 16 through a contact hole (see the coarse broken line in FIG. 3) formed in the interlayer insulation film 15. In addition, the drain electrode 14ab is provided so as to overlap a rectangular widened portion of each of the capacitor lines 11b through the gate insulation film 12, and thus forms an auxiliary capacitor.

As shown in FIGS. 4 and 5, the protection circuit 4a includes gate metal layers 11ca and 11b each conducting to an inspection gate signal input terminal (not shown), the gate insulation film 12 provided so as to cover the gate metal layers 11ca and 11cb, a pair of semiconductor layers 13ca and 13cb each provided in the form of an island at a location corresponding to the gate metal layer 11ca over the gate insulation film 12, a pair of semiconductor layers 13cc and 13cd each provided in the form of an island at a location corresponding to the gate metal layer 11b over the gate insulation film 12, and source metal layers 14ca and 14cb provided so that protrusions thereof face each other over the semiconductor layers 13ca, 13cb, 13cc, and 13cd. Here, the source metal layer 14ca is coupled to the gate metal layer 11ca through a contact hole (see the coarse broken line in FIG. 5) formed in the gate insulation film 12, and conducts to, for example, the first, fifth, ninth, . . . —that is, (4n−3)-th (where n is a natural number)—gate lines 11a among the odd-numbered gate lines 11a through a TFT for inspection 5ca. In addition, the source metal layer 14cb is coupled to the gate metal layer 11cb through a contact hole (see the coarse broken line in FIG. 5) formed in the gate insulation film 12, and conducts to, for example, the third, seventh, eleventh, . . . —that is, (4n−1)-th (where n is a natural number)—gate lines 11a among the odd-numbered gate lines 11a through a TFT for inspection 5cb. Moreover, the protection circuit 4a is configured so as to prevent the characteristics of the semiconductor layers in the TFT devices from changing when the amount of electric charge stored in the gate metal layer 11ca or 11cb reaches or exceeds a predetermined amount during the manufacturing process and/or inspection process.

As shown in FIG. 6, the protection circuit 4b includes gate metal layers 11da and 11db each having one end conducting to odd-numbered gate lines 11a, the gate insulation film 12 provided so as to cover the gate metal layers 11da and 11db, a pair of semiconductor layers 13da and 13db each provided in the form of an island at a location corresponding to the gate metal layer 11da over the gate insulation film 12, a pair of semiconductor layers 13dc and 13dd each provided in the form of an island at a location corresponding to the gate metal layer 11db over the gate insulation film 12, and source metal layers 14da and 14db provided so that protrusions thereof face each other over the semiconductor layers 13da, 13db, 13dc, and 13dd. Here, the source metal layer 14da is coupled to the gate metal layer 11da through a contact hole (see the coarse broken line in FIG. 6) formed in the gate insulation film 12, and is electrically coupled to (4n−3)-th (where n is a natural number) gate lines 11a and to a gate driver chip (not shown). In addition, the source metal layer 14db is coupled to the gate metal layer 11db through a contact hole (see the coarse broken line in FIG. 6) formed in the gate insulation film 12, and is electrically coupled to (4n−1)-th (where n is a natural number) gate lines 11a and to the gate driver chip (not shown). Moreover, the protection circuit 4b is configured so that, when the amount of electric charge locally stored in a gate line 11a reaches or exceeds a predetermined value during the manufacturing process and/or inspection process, the protection circuit 4b discharges the electric charge to a near gate line 11a, thereby prevents a change in the characteristics of the TFT devices due to a strong electric field.

As shown in FIGS. 1 and 7, each of the TFTs for inspection 5b includes a gate electrode 11e conducting to an ON signal input terminal for TFT for inspection, the gate insulation film 12 provided so as to cover the gate electrode 11e, a semiconductor layer 13e provided in the form of an island at a location corresponding to the gate electrode 11e over the gate insulation film 12, and a source electrode 14ea and a drain electrode 14eb provided so as to face each other over the semiconductor layer 13e. Here, the source electrodes 14ea are coupled to the respective source lines 14a. Each of the drain electrodes 14eb conducts to an inspection source signal input terminal. Each of the TFTs for inspection 5b is configured to control the input of the inspection source signal for the corresponding source line 14a during dynamic operating inspection of the LCD panel 40a.

The transparent adhesion layers 44a and 44h are formed of, for example, adhesive, glue, etc.

The light-blocking film 46 is formed by printing a resin film having light-blocking properties or by depositing a metal film having light-blocking properties on the surface of the light guide plate 42b, or by using the both methods.

As shown in FIG. 1, the CF substrate 30a includes a black matrix 21 having a plurality of light-blocking regions 21a (see FIG. 3) provided over the insulating substrate 10b so as to overlap the respective TFTs 5a on the TFT substrate 20 in the display region D, and a plurality of light-blocking regions 21b (see FIG. 2) provided over the insulating substrate 10b so as to overlap the protection circuits 4a and 4b and the respective TFTs for inspection 5b on the TFT substrate 20 in the frame region F; a color filter layer 22 having a red layer, a green layer, a blue layer, etc. provided over the insulating substrate 10b so as to overlap the pixel electrodes 16 over the TFT substrate 20; a common electrode 23 provided so as to cover the light-blocking regions 21a and the color filter layer 22; and a photo spacer (not shown) provided in a column shape over the common electrode 23.

Figure 8:
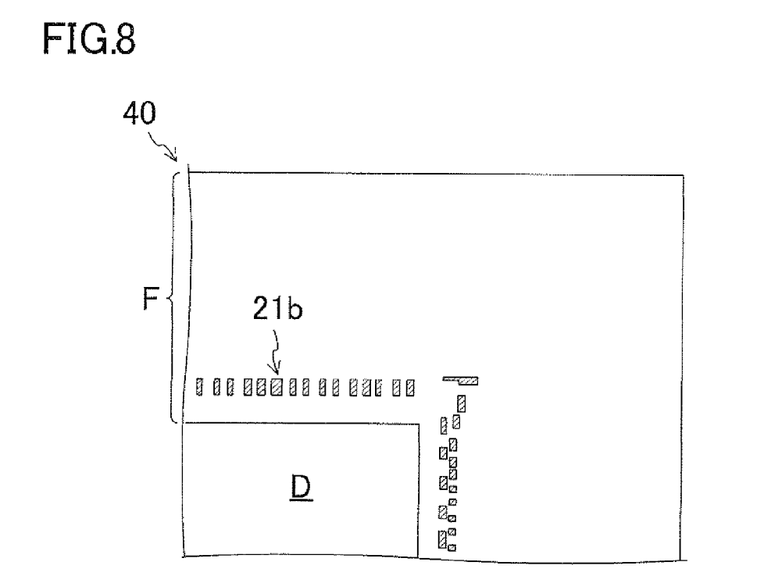
Figure 9:
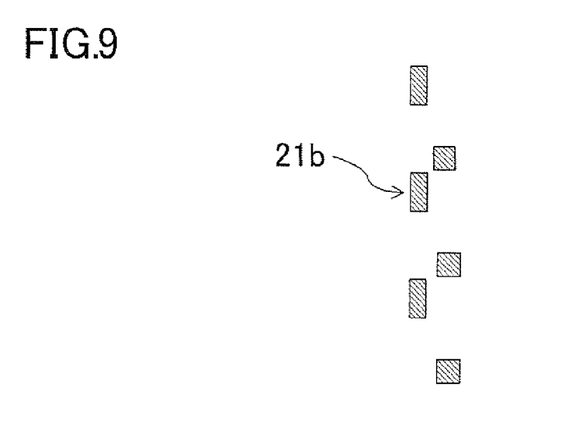
FIG. 9 is a magnified top view of a light-blocking region 21b extending in the longitudinal direction in FIG. 8.

Here, FIG. 8 is a top view of a corner of the LCD panel 40a as viewed from the CF substrate 30a side. FIG. 9 is a magnified top view of a light-blocking region 21b extending in the longitudinal direction in FIG. 8, and FIG. 10 is a magnified top view of a light-blocking region 21b extending in the lateral direction in FIG. 8.

Figure 10:
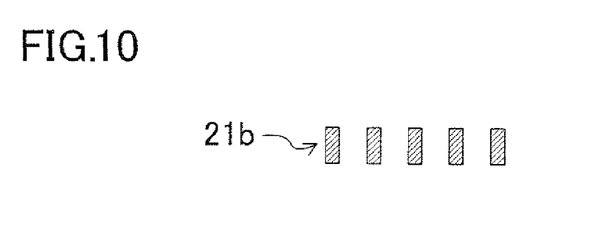
FIG. 10 is a magnified top view of a light-blocking region 21b extending in the lateral direction in FIG. 8.

As shown in FIGS. 8-10, the light-blocking regions 21b are arranged in a generally rectangular dot pattern so as to overlap the semiconductor devices such as the protection circuits 4a and 4b, the TFTs for inspection 5b, etc., and to be spaced apart from one another. Here, the size of the light-blocking region 21b overlapping the protection circuit 4a is, for example, 0.13 mm×0.04 mm. The size of the light-blocking regions 21b overlapping the TFTs for inspection 5b, 5ca, and 5cb is, for example, 0.09 mm×0.04 mm. The size of the light-blocking region 21b overlapping the protection circuit 4b is, for example, 0.05 mm×0.05 mm.

As shown in FIG. 1, the liquid crystal layer 25 includes a photopolymerized polymer matrix 25a and a plurality of liquid crystal material droplets 25b in the form of small particles dispersed in the polymer matrix 25a.

The LCD device 50a having such a configuration is configured to display an image by applying a predetermined voltage to the liquid crystal layer 25 between each of the pixel electrodes 16 over the TFT substrate 20 and the common electrode 23 over the counter substrate 30a on a per-pixel P basis, and thus changing the orientation conditions of the liquid crystal material droplets 25b dispersed in the liquid crystal layer 25, thereby adjusting on a per-pixel P basis how the light transmitted through the LCD panel 40a is scattered, or adjusting how the light incident upon the LCD panel 40 through the light guide plate 42b is scattered.

Next, a method for fabricating the LCD device 50a of this embodiment will be described. Here, the fabrication method of this embodiment includes a TFT substrate manufacturing step, a CF substrate manufacturing step, a liquid crystal filling step, a light irradiation step, and a light guide plate bonding step.

<TFT Substrate Manufacturing Step>

First, for example, a titanium film, an aluminum film, a titanium film, etc. are sequentially formed, by sputtering, over the entire substrate of the insulating substrate 10a such as a glass substrate; and thereafter, photolithographic patterning is performed, and the gate lines 11a, the capacitor lines 11b, the gate electrodes 11aa and 11e, and the gate metal layers 11ca, 11cb, 11da, and 11db are formed to a thickness of about 0.2 μm.

Subsequently, for example, a silicon nitride film etc. is formed by a plasma chemical vapor deposition (CVD) technique over the entire substrate upon which the gate lines 11a, the capacitor lines 11b, the gate electrodes 11aa and 11e, and the gate metal layers 11ca, 11cb, 11da, and 11db have been formed, and the gate insulation film 12 is formed to a thickness of about 0.4 μm. At this point, in the frame region F, the gate insulation film 12 is patterned by photolithography, and contact holes for connecting the gate metal layers 11ca, 11cb, 11da, and 11db respectively to the source metal layers 14ca, 14cb, 14da, and 14db are formed.

Moreover, an intrinsic amorphous silicon layer and an n+ amorphous silicon layer doped with phosphorous are sequentially fanned by a plasma CVD technique over the entire substrate upon which the gate insulation film 12 has been formed; and thereafter, the intrinsic amorphous silicon layer and the n+ amorphous silicon layer are patterned by photolithography in the form of islands over the gate electrodes 11aa and 11e, and the gate metal layers 11ca, 11cb, 11da, and 11db, and thus the semiconductor layers 13a, 13ca, 13cb, 13cc, 13cd, 13da, 13db, 13dc, 13dd, and 13e are formed, in which the intrinsic amorphous silicon layer having a thickness of about 0.1 μm and the n+ amorphous silicon layer having a thickness of about 0.05 μm are stacked.

Then, for example, an aluminum film, a titanium film, etc. are sequentially formed, by sputtering, over the entire substrate upon which the semiconductor layers 13a, 13ca, 13cb, 13cc, 13cd, 13da, 13db, 13dc, 13dd, and 13e have been formed, and thereafter, photolithographic patterning is performed, and the source lines 14a, the source electrodes 14aa and 14ea, the drain electrodes 14ab and 14eb, and the source metal layers 14ca, 14eb, 14da, and 14db are fanned to a thickness of about 0.35 μm.

Subsequently, the channel regions are patterned by etching the n+ amorphous silicon layers of the semiconductor layers 13a, 13ca, 13cb, 13cc, 13cd, 13da, 13db, 13dc, 13dd, and 13e using as masks the source electrodes 14aa and 14ea, the drain electrodes 14ab and 14eb, and the source metal layers 14ca, 14cb, 14da, and 14db; and thus the TFTs 5a, the TFTs for inspection 5b, 5ca, and 5cb, and the protection circuits 4a and 4b are formed.

Furthermore, for example, an inorganic insulation film, such as a silicon nitride film, is formed to a thickness of about 0.3 μm by a plasma CVD technique over the entire substrate upon which the TFTs 5a, the TFTs for inspection 5b, 5ca, and 5cb, and the protection circuits 4a and 4b have been formed; and thereafter, for example, acrylic photosensitive resin etc. is applied to a thickness of about 2.5 μm by spin-coating. Then, the applied photosensitive resin is irradiated with light with a photo mask and then developed; and thus, an organic insulation film is formed which is patterned to define contact holes over the drain electrodes 14ab, and then, the inorganic insulation film exposed from the organic insulation film is etched away to form the contact holes. Thus, the interlayer insulation film 15 is formed.

Finally, an indium tin oxide (ITO) film is formed, by sputtering, over the entire substrate over the interlayer insulation film 15; and thereafter, photolithographic patterning is performed, and the pixel electrodes 16 are formed to a thickness of about 0.1 μm.

In this way, the TFT substrate 20 can be manufactured.

<CF Substrate Manufacturing Step>

First, for example, acrylic photosensitive resin in which small particles of a substance such as carbon is dispersed is applied, by spin-coating, to the entire substrate of the insulating substrate 10b such as a glass substrate; and the applied photosensitive resin is irradiated with light with a photo mask and then developed. Thus, the black matrix 21 having the light-blocking regions 21a and 21b is formed to a thickness of about 1.5 μm.

Subsequently, for example, red-, green-, or blue-colored acrylic photosensitive resin is applied to the substrate upon which the black matrix 21 has been formed; and patterning is performed by irradiating the applied photosensitive resin with light with a photo mask and then developing, and thus a colored layer of the selected color (e.g., a red layer) is formed to a thickness of about 1.5 μm. A similar step is repeated for the other two colors to form, color layers of the other two colors (e.g., green and blue layers) to a thickness of about 1.5 μm. Thus, the color filter layer 22 is fanned.

Then, for example, an ITO film is formed, by sputtering, over the substrate upon which the color filter layer 22 has been formed, and the common electrode 23 is formed to a thickness of about 0.1 μm.

Finally, photosensitive resin is applied, by spin-coating, to the entire substrate upon which the common electrode 23 has been formed; and the applied photosensitive resin is irradiated with light with a photo mask and then developed. Thus, the photo spacer is formed to a thickness of about 6.5 μm.

In this way, the CF substrate 30a can be manufactured.

<Liquid Crystal Filling Step>

First, for example, the sealing material 26 is formed by a printing method, which is made of thermosetting resin including conductive particles for conducting current between the common electrode 23 over the CF substrate 30a and a common transfer region (not shown) over the TFT substrate 20, in the frame region F of the CF substrate 30a manufactured in the CF substrate manufacturing step described above. Here, the sealing material 26 has, on one side thereof, a liquid crystal filling port for vacuum filling of the liquid crystal material.

Subsequently, the CF substrate 30a upon which the sealing material 26 has been formed and the TFT substrate 20 manufactured in the TFT substrate manufacturing step described above are bonded together; and thereafter, the sealing material 26 between the TFT substrate 20 and the CF substrate 30a is cured by heating. Thus, a bonded structure 45 is manufactured.

Finally, the gap between the TFT substrate 20 and the CF substrate 30a of the bonded structure 45 is filled with a mixed material (25) containing the liquid crystal material droplets (25b) and a monomer (25a) having photopolymerizability through the liquid crystal filling port by vacuum filling, and thereafter, the liquid crystal filling port is end-sealed by a sealant made of visible light curable resin which reacts to light having a wavelength to which an after-mentioned initiator included in the mixed material does not react, which is, for example, 420 nm.

<Light Irradiation Step>

The monomer (25a) is polymerized by irradiating, with UV light, the mixed material (25) of the bonded structure 45, which has been filled with the mixed material (25) containing the liquid crystal material droplets (25b), the monomer (25a), and the initiator for a reaction with UV light during the liquid crystal filling step described above; and thus the liquid crystal layer 25 is formed.

In this way, the LCD panel 40a can be manufactured.

<Light Guide Plate Bonding Step>

An LED 43 is attached to the LCD panel 40a manufactured in the light irradiation step described above, and the protection plate 42a and the light guide plate 42b are bonded to the surface of the LCD panel 40a respectively interposing the transparent adhesion layers 44a and 44b therebetween; and thereafter, the lower frame 41a and the upper frame 41b are attached to the frame regions F of the protection plate 42a and of the light guide plate 42b.

Thus, the LCD device 50a of this embodiment can be fabricated.

As described above, according to the LCD device 50a and the fabrication method thereof of this embodiment, the black matrix 21 in the frame region F of the CF substrate 30a includes the plurality of light-blocking regions 21b spaced apart from one another in the CF substrate manufacturing step; and therefore the frame region F has no light-blocking properties such as those found in conventional ones, but has optical transparency between the plurality of light-blocking regions 21b. Accordingly, the monomer (25a) having photopolymerizability contained in the polymer-dispersed liquid crystal layer 25 can be irradiated with UV light in the light irradiation step, and therefore remaining of unreacted monomer in the liquid crystal layer 25 can be reduced. Thus, the penetration of unreacted monomer in the frame region F into the display region D is reduced, thereby allowing the display non-uniformity due to penetration in the peripheral edge of the display region D to be reduced.

In addition, according to the LCD device 50a of this embodiment, the respective light-blocking regions 21b are provided so as to overlap the semiconductor devices such as the protection circuits 4a and 4b, and the respective TFTs for inspection 5b, 5ca, and 5cb disposed in the frame region F, and thus light incidence from the front to the semiconductor devices can be reduced.

Moreover, according to the LCD device 50a of this embodiment, the semiconductor devices disposed in the frame region F are the protection circuits 4a and 4b, and the TFTs for inspection 5b, 5ca, and 5cb, and thus the occurrence of leakage current due to light irradiation can be reduced.

Furthermore, according to the LCD device 50a of this embodiment, the lower frame 41a and the upper frame 41b both having light-blocking properties, and the light-blocking film 46 are provided in the frame region F, and thus peripheral circuits etc. disposed in the frame region F can be shielded, thereby allowing the appearance of the device to be improved.

Still furthermore, according to the LCD device 50a of this embodiment, the respective light-blocking regions 21a included in the black matrix 21 overlap the TFTs 5a provided in the respective pixels P in the display region D, the occurrence of leakage current due to light irradiation is reduced in the TFTs 5a of the respective pixels P.

In addition, according to the LCD device 50a of this embodiment, the black matrix 21 is made of resin, and thus the black matrix 21 can be formed to a relatively large thickness, thereby allowing the occurrence of diffracted light to be reduced on the backside of the black matrix 21.

<<Second Embodiment of Invention>>

Figure 11:
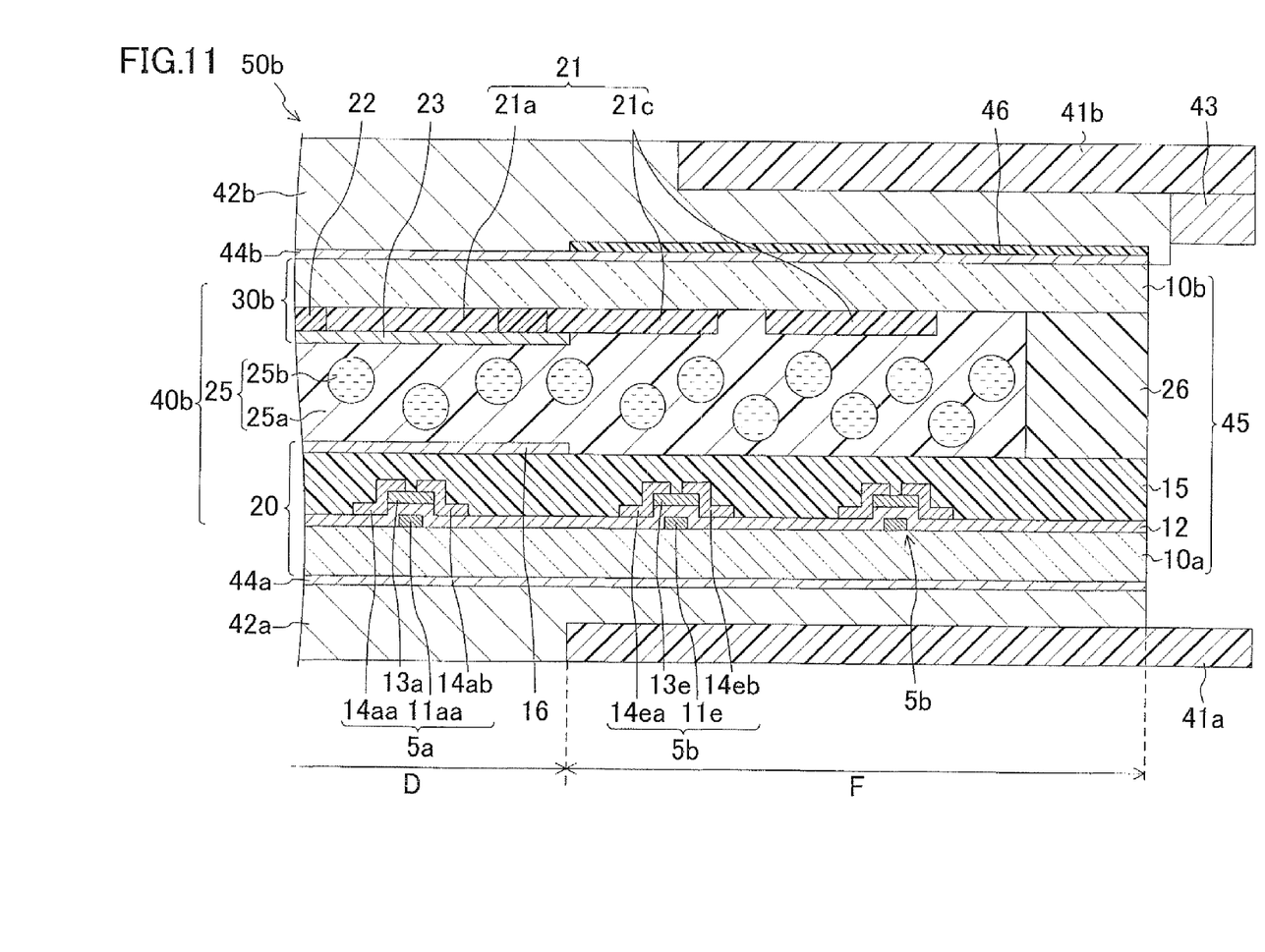
FIG. 11 is a cross-sectional view of an LCD device 50b according to the second embodiment.

FIG. 11 is a cross-sectional view of an LCD device 50b of this embodiment. Note that, in each embodiment described below, the same reference characters as those shown in FIGS. 1-10 are used to represent equivalent elements, and the detailed explanation thereof will be omitted.

While the respective light-blocking regions 21b overlap the semiconductor devices without a shift in the LCD device 50a of the first embodiment described above, respective light-blocking regions 21c are provided with a shift with respect to the semiconductor devices in the LCD device 50b of this embodiment.

More specifically, in the LCD device 50b, as shown in FIG. 11, the respective light-blocking regions 21.c are provided with a shift toward the display region D with respect to the TFTs for inspection 5b on a CF substrate 30b included in an LCD panel 40b. The other part of the configuration is substantially the same as that of the LCD device 50a of the first embodiment described above.

According to the LCD device 50b of this embodiment, similarly to the first embodiment described above, the black matrix 21 in the frame region F of the CF substrate 30b includes the plurality of light-blocking regions 21c spaced apart from one another, and thus the display non-uniformity due to penetration in the peripheral edge of the display region D can be reduced; and in addition, since the respective light-blocking regions 21c are provided with a shift toward the display region D with respect to the TFTs for inspection 5b disposed in the frame region F, the incidence to the TFTs for inspection 5b of oblique light, such as diffracted light from inner peripheral edges of the lower frame 41a and of the light-blocking film 46 covering the frame region F, and multiple-reflected light within the CF substrate 30b, can be reduced.

<<Third Embodiment of Invention>>

Figure 12:
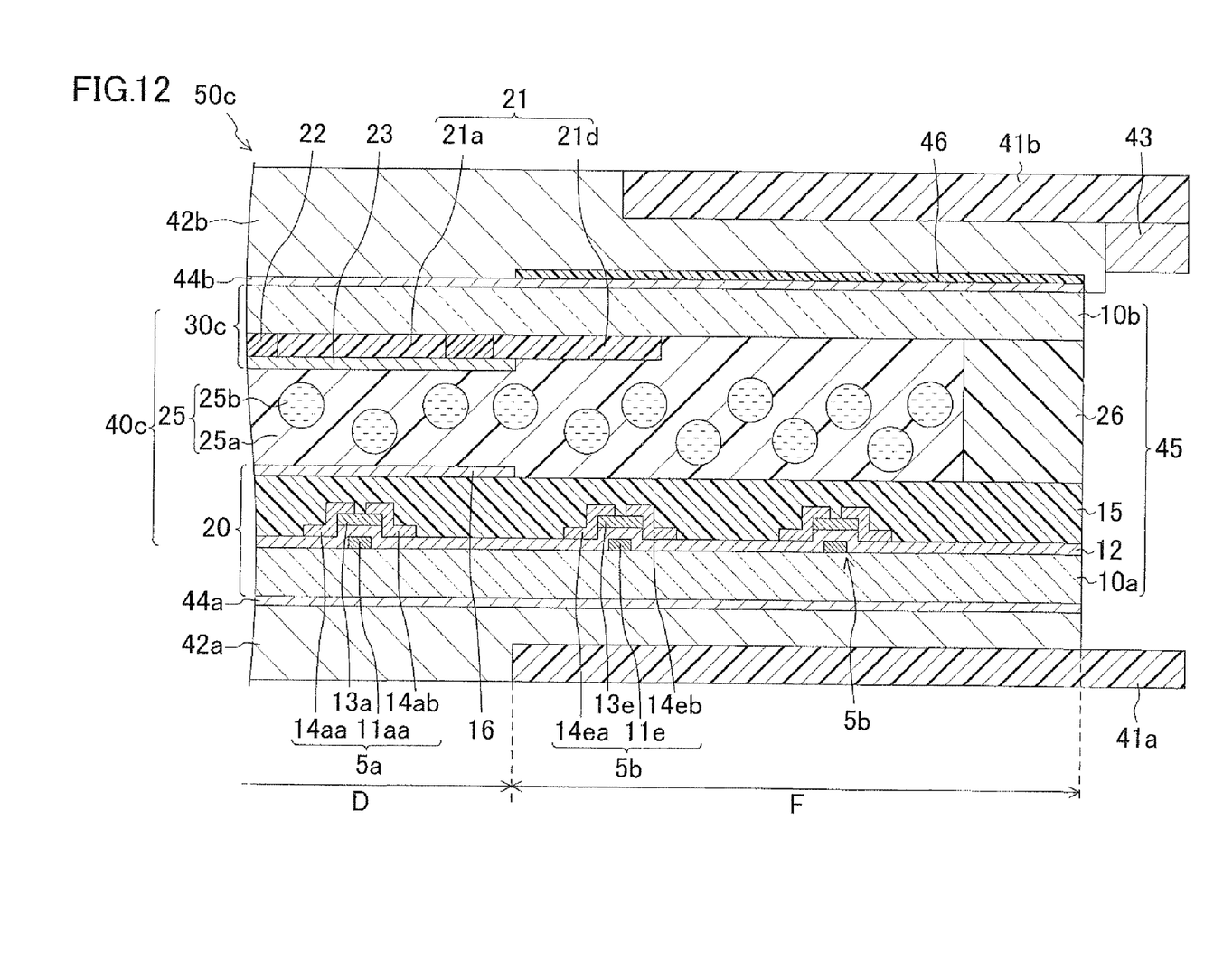
FIG. 12 is a cross-sectional view of an LCD device 50c according to the third embodiment.

FIG. 12 is a cross-sectional view of an LCD device 50c of this embodiment.

While each of the light-blocking regions 21b and 21c is provided for each semiconductor device in the LCD devices 50a and 50b of the first and the second embodiments described above, respective light-blocking regions 21d are provided with a shift with respect to inner semiconductor devices in the LCD device 50c of this embodiment.

More specifically, in the LCD device 50c, as shown in FIG. 12, the respective light-blocking regions 21d are provided with a shift toward the display region D with respect to the inner (left in the figure) TFTs for inspection 5b, and no light-blocking regions are provided for the outer (right in the figure) TFTs for inspection 5b on a CF substrate 30c included in an LCD panel 40c. The other part of the configuration is substantially the same as that of the LCD device 50a of the first embodiment described above. That is, in the LCD device 50c, the plurality of light-blocking regions 21d are disposed in the frame region F such that more light-blocking regions 21d are provided in the inner peripheral edge than in the outer peripheral edge of the frame region F.

According to the LCD device 50c of this embodiment, similarly to the first embodiment described above, the black matrix 21 in the frame region F of the CF substrate 30c includes the plurality of light-blocking regions 21d spaced apart from one another, and thus the display non-uniformity due to penetration in the peripheral edge of the display region D can be reduced; and in addition, since more light-blocking regions 21d are disposed in the inner peripheral edge than in the outer peripheral edge of the frame region F, the incidence to the TFTs for inspection 5b of oblique light, such as diffracted light from inner peripheral edges of the lower frame 41a and of the light-blocking film 46, and multiple-reflected light within the CF substrate 30c, can be effectively reduced.

Although, in each embodiment described above, semiconductor devices using amorphous silicon have been presented by way of example, the present invention may also be applied to semiconductor devices using polysilicon, more specifically, semiconductor devices such as monolithic driver circuits.

Although, in each embodiment described above, a method for fabricating an LCD device using a vacuum filling technique has been presented by way of example, the present invention may also be applied to a method for fabricating an LCD device using what is called one drop filling (ODF) technique. Here, since an ODF technique uses a light curable sealing material, the configuration of each embodiment in which the black matrix in the frame region includes a plurality of light-blocking regions is also advantageous to curing the sealing material.

Although, in each embodiment described above, the configuration has been presented by way of example in which the black matrix is provided on the CF substrate side, the present invention may also be applied to a configuration in which the black matrix is provided on the TFT substrate side.

Although, in each embodiment described above, the LCD device having the color filter layer 22 and having color display capabilities has been presented by way of example, the present invention may also be applied to an LCD device having monochrome display capabilities.

Industrail Applicability

As described above, the present invention provides LCD devices using PDLC in which the display non-uniformity due to penetration in the peripheral edge of the display region is reduced, and thus, is useful for LCD panels which each perform display functions by switching between transmission and scattering in the display region, LCD panels which each perform display functions by switching between absorption and scattering in the display region using a polarizing plate, etc.

Description Of Reference Characters

D Display Region
F Frame Region
P Pixel
4a, 4b Protection Circuit (Semiconductor Device)
5a TFT
5b, 5ca, 5cb TFT for Inspection (Semiconductor Device)
20 TFT Substrate (Second Substrate)
21 Black Matrix
21a-21d Light-Blocking Region
25 Liquid Crystal Layer (Mixed Material)
25a Polymer Matrix (Monomer)
25b Liquid Crystal Material Droplet
30a-30c CF Substrate (First Substrate)
41a Lower Frame (Light-Blocking Member)
41b Upper Frame (Light-Blocking Member)
45 Bonded Structure
46 Light-Blocking Film (Light-Blocking Member)
50a-50c Liquid Crystal Display (LCD) Device

The invention claimed is:

1. A liquid crystal display device, comprising:
a first and a second substrates disposed to face each other;
a polymer-dispersed liquid crystal layer provided between the first and the second substrates; and
a black matrix provided on the first substrate,
wherein
a display region for displaying an image and a frame region around the display region are defined,
in the frame region, the black matrix includes a plurality of light-blocking regions spaced apart from one another, and
each of the light-blocking regions is provided with a shift toward the display region with respect to a semiconductor device disposed in the frame region.

2. The liquid crystal display device of claim 1, wherein the semiconductor devices are thin film transistors.

3. The liquid crystal display device of claim 1, wherein in the frame region, a light-blocking member having light-blocking properties is provided in a frame shape.

4. The liquid crystal display device of claim 3, wherein the plurality of light-blocking regions are disposed such that more light-blocking regions are provided in the inner peripheral side of the frame region than in the outer peripheral side of the frame region.

5. The liquid crystal display device of claim 1, wherein in the display region, a plurality of pixels each having a thin film transistor are provided in a matrix, and the black matrix includes a plurality of light-blocking regions spaced apart from one another and overlapping the respective thin film transistors.

6. The liquid crystal display device of claim 1, wherein the black matrix is made of resin.

* * * * *